United States Patent
Primavesi (10) Patent No.: US 10,546,061 B2
(45) Date of Patent: Jan. 28, 2020

(54) PREDICTING TERMS BY USING MODEL CHUNKS

(71) Applicant: Microsoft Technology Licensing, LLC, Redmond, WA (US)

(72) Inventor: Alexander Gautam Primavesi, London (GB)

(73) Assignee: Microsoft Technology Licensing, LLC, Redmond, WA (US)

(*) Notice: Subject to any disclaimer, the term of this patent is extended or adjusted under 35 U.S.C. 154(b) by 73 days.

(21) Appl. No.: 15/359,181

(22) Filed: Nov. 22, 2016

(65) Prior Publication Data

US 2018/0052819 A1 Feb. 22, 2018

Related U.S. Application Data (60) Provisional application No. 62/376,226, filed on Aug. 17, 2016.

(51) Int. Cl.
*G06F 17/27* (2006.01)

(52) U.S. Cl.
CPC ........ *G06F 17/276* (2013.01); *G06F 17/2725* (2013.01); *G06F 17/2775* (2013.01)

(58) Field of Classification Search
None
See application file for complete search history.

(56) References Cited

U.S. PATENT DOCUMENTS

| | | | |
|---|---|---|---|
| 5,805,911 A | 9/1998 | Miller | |
| 5,963,671 A | 10/1999 | Comerford et al. | |
| 7,020,587 B1 * | 3/2006 | Di | G06F 17/27 703/2 |
| 7,177,797 B1 * | 2/2007 | Micher | G06F 17/276 704/1 |
| 7,933,777 B2 | 4/2011 | Koll | |
| 8,463,610 B1 * | 6/2013 | Bourke | G10L 15/285 704/257 |

(Continued)

OTHER PUBLICATIONS

Bogoychev, Nikolay, and Adam Lopez. "N-gram language models for massively parallel devices." In Proceedings of the 54th Annual Meeting of the Association for Computational Linguistics (vol. 1: Long Papers), vol. 1, pp. 1944-1953. 2016. (Year: 2016).*

(Continued)

*Primary Examiner* — Jonathan C Kim
(74) *Attorney, Agent, or Firm* — Schwegman Lundberg & Woessner, P.A.

(57) ABSTRACT

The description relates to predicting terms based on text inputted by a user. One example can include a computing device comprising a prediction engine stored at the computing device. In this example, the prediction engine has previously been trained to predict terms from text. The computing device also comprises a secondary memory, for example a hard drive, storing a model used by the prediction engine to compute predicted terms from text. The computing device also comprises a primary memory, for example Random Access Memory (RAM), and a processor. The processor is configured to access one or more chunks of the model from the secondary memory based on the text input and to provide the one or more chunks to the primary memory during execution of the prediction engine.

17 Claims, 7 Drawing Sheets

(56) References Cited

U.S. PATENT DOCUMENTS

| | | | |
|---|---|---|---|
| 8,825,474 B1* | 9/2014 | Zhai | G06F 17/276 |
| | | | 704/1 |
| 9,250,728 B2 | 2/2016 | Danzinger et al. | |
| 2004/0156562 A1 | 8/2004 | Mulvey et al. | |
| 2014/0215327 A1* | 7/2014 | Eleftheriou | G06F 17/276 |
| | | | 715/271 |
| 2015/0100537 A1* | 4/2015 | Grieves | G06N 5/048 |
| | | | 706/52 |
| 2015/0222617 A1 | 8/2015 | Ebersman et al. | |
| 2016/0173428 A1 | 6/2016 | Balasubramanian et al. | |
| 2016/0210354 A1* | 7/2016 | Wijnen | G06F 16/3344 |
| 2016/0275070 A1* | 9/2016 | Corston | G06F 3/0236 |
| 2016/0292148 A1* | 10/2016 | Aley | G06F 17/276 |
| 2017/0185581 A1* | 6/2017 | Bojja | G06F 17/24 |
| 2017/0300462 A1* | 10/2017 | Cudworth | G06F 3/0482 |
| 2017/0308290 A1* | 10/2017 | Patel | G06F 3/04886 |
| 2017/0344224 A1* | 11/2017 | Kay | G06F 3/04817 |
| 2017/0357438 A1* | 12/2017 | Dixon | G06F 3/0237 |
| 2017/0364504 A1* | 12/2017 | Dandapat | G06F 17/279 |
| 2017/0371522 A1* | 12/2017 | Martinez del Corral | |
| | | | G06F 3/04842 |
| 2018/0053101 A1* | 2/2018 | Cudworth | H04M 1/72522 |

OTHER PUBLICATIONS

"Emoji prediction app SWIFTMOJI launches today", Published on: Jul. 20, 2016 Available at: https://blog.swiftkey.com/emoji-prediction-app-swiftmoji-launches-today/.

"What is Emoji Prediction?", Published on: Nov. 19, 2014 Available at: https://blog.swiftkey.com/what-is-emoji-prediction/.

Zhai, et al., "Performance Optimization of Virtual Keyboards", In Journal of Human-Computer Interaction, vol. 17, Issue 2-3, Sep. 2002, pp. 89-129.

Russakovskii, Artem, "Security Advisory: A.I.Type Keyboard Sends All Your Keystrokes to Their Servers in Plain-Text—Sometimes You Can't Trust the Cloud", Published on: Oct. 26, 2011 Available at: http://www.androidpolice.com/2011/10/26/security-advisory-a-i-type-keyboard-sends-all-your-keystrokes-to-their-servers-in-plain-text-sometimes-you-cant-trust-the-cloud/.

* cited by examiner

PREDICTING TERMS BY USING MODEL CHUNKS

CROSS-REFERENCE TO RELATED APPLICATION

This non-provisional utility application claims priority to U.S. application Ser. No. 62/376,226 entitled "Predicting Terms By Using Model Chunks" and filed on 17 Aug. 2016, which is incorporated herein in its entirety by reference.

BACKGROUND

Predictive emoji keyboards predict emoji based on what the user has typed. The words and phrases typed by the user are used as inputs for a prediction model and the prediction model is used to generate one or more predicted emojis to be presented to the user. The prediction model includes possible text inputs such as words and combinations of words, and can be implemented using a hashmap or dictionary loaded from a file in a format such as JavaScript Object Notation (JSON).

Figure 1:
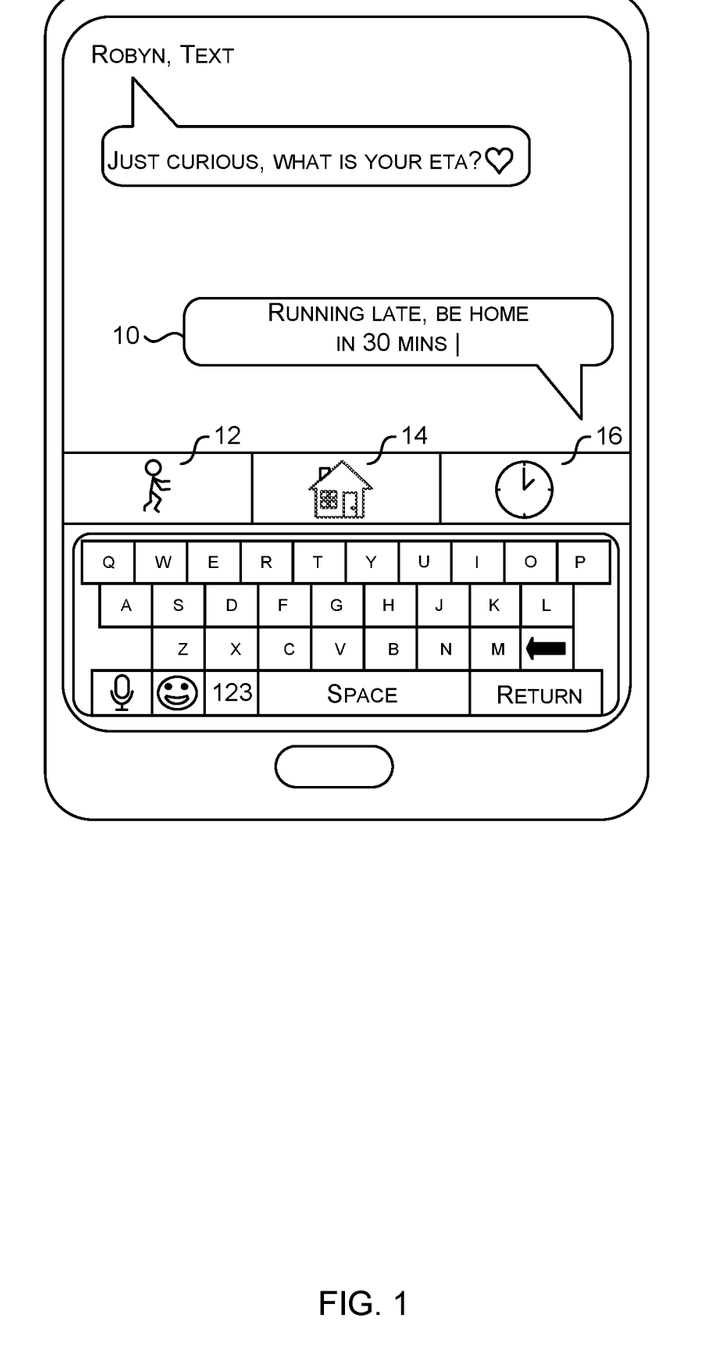
FIG. 1 is a schematic diagram of a mobile device presenting predicted emoji to a user based on text input.

Each word or combination of words assigns a score to every emoji which is reflected in the model. For example, the combination of words "I love you" might associate a high score to the red heart emoji. If a user types in "I love you", high scoring emojis associated with that phrase can be looked up in the prediction model, and the top scoring emojis can be presented to the user. Referring to FIG. 1, a longer text input 10 could be "Running late, be home in 30 mins". The top three scoring emojis associated with this input text might be a running man emoji 12, a house emoji 14 and a clock emoji 16.

In order to support a large vocabulary of text inputs, the model may be very large: for example, 300 megabytes in JSON format. Unfortunately, the hashmap and dictionary data structures need to be fully loaded into primary Random Access Memory (RAM) from secondary memory such as the hard drive in order to be used efficiently. Calculating the predictions is therefore RAM-intensive and not suitable for running on personal computing devices such as mobile devices where RAM is a precious resource. As a result, either prediction models are loaded into RAM on servers and personal computing devices are required to communicate with the server via the Internet to request emoji predictions, or vastly reduced prediction models are used on the device with an impact on prediction quality.

The embodiments described below are not limited to implementations which solve any or all of the disadvantages of known techniques.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified faun as a prelude to the more detailed description that is presented later.

The description relates to predicting terms based on text inputted by a user. One example can include a computing device comprising a prediction engine stored at the computing device. In this example, the prediction engine has previously been trained to predict terms from text. The computing device also comprises a secondary memory, for example a hard drive, storing a model used by the prediction engine to compute predicted terms from text. The computing device also comprises a primary memory, for example Random Access Memory (RAM), and a processor. The processor is configured to access one or more chunks of the model from the secondary memory based on the text input and to provide the one or more chunks to the primary memory during execution of the prediction engine.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example are constructed or utilized. The description sets forth the functions of the example and the sequence of operations for constructing and operating the example. However, the same or equivalent functions and sequences may be accomplished by different examples.

The present disclosure presents a format for storing prediction models. The format makes prediction calculations much less RAM-intensive, enabling them to be performed locally by a personal computing device.

Figure 2:
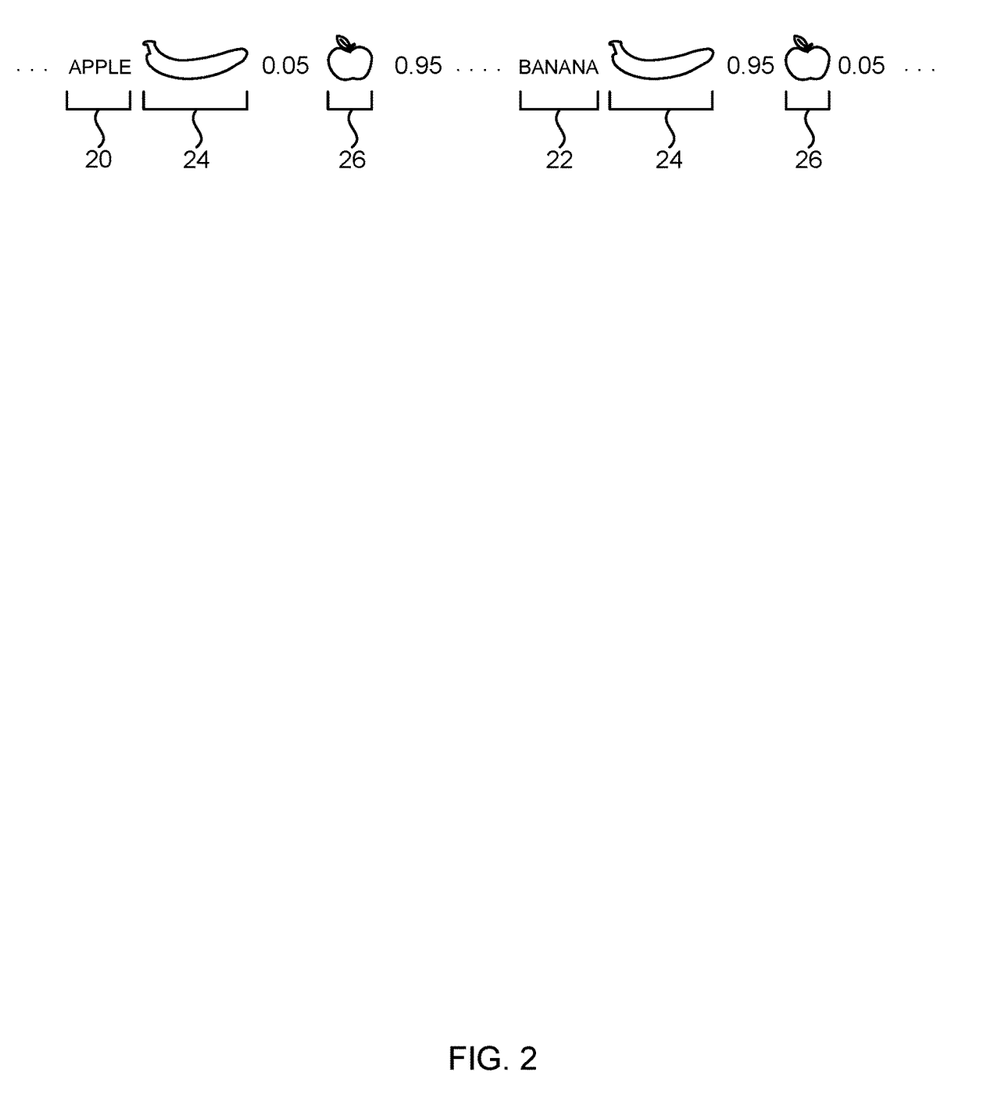
FIG. 2 is a representation of a file format for a prediction model according to the present disclosure.

Referring to FIG. 2, the format may comprise a list of words in alphabetical order, including the words apple 20 and banana 22. Each word assigns a score to one or more emoji. For example, the word apple 20 assigns a score of 0.05 to a banana emoji 24 and a score of 0.95 to an apple emoji 26. Similarly, the word banana 22 assigns a score of 0.95 to the banana emoji 24 and a score of 0.05 to the apple emoji 26. In this example, each word immediately preceeds the emoji and scores belonging to it. Furthermore, each score immediately follows the emoji to which it is assigned by the preceding word. In other examples, the scores may precede the emoji, or the emoji might be taken out and the order of the scores indicates which emoji each score relates to. Furthermore, in other examples the words might be in another suitable order such as reverse alphabetical order. In some examples, the use of a newline character as a delimiter is employed to mark the separation between the final digit of the final score assigned by a word and the next word in the list.

The described format may be referred to as a flattened format comprising a list of consecutive entries. Such a format is much more condensed than other formats and may be around 30 megabytes in size. The model may also be trimmed by removing some of the least likely n-gram and emoji pairs to make it smaller. This reduces the size of the application that has to be downloaded to a computing device such as a smartphone.

The flattened prediction model is stored on a computing device in secondary memory, such as on a hard-drive.

Figure 3:
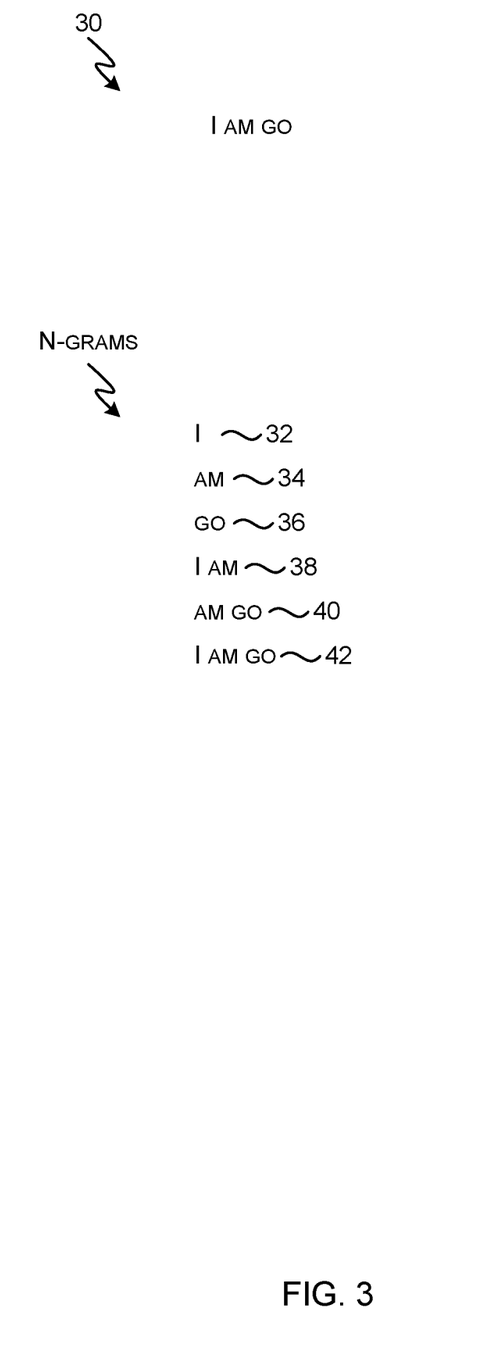
FIG. 3 is a schematic diagram showing generation of n-grams from text input.

In order to use the model to compute a prediction, a prediction engine running on the computing device generates n-grams from the text input. An n-gram is a sequence of n written language components (usually words, sometimes including characters such as punctuation characters or emoji), where n can be any whole, positive number. For example, an n-gram may be a word, phrase, or part of a phrase occurring in the text input. For example, referring to FIG. 3, the user might type in the text input 30 "I am go". Six n-grams can be generated from this text input 30. There are the first, second, third, fourth, fifth and sixth n-grams, 32, 34, 36, 38, 40 and 42, respectively, as shown in FIG. 3.

Figure 4:
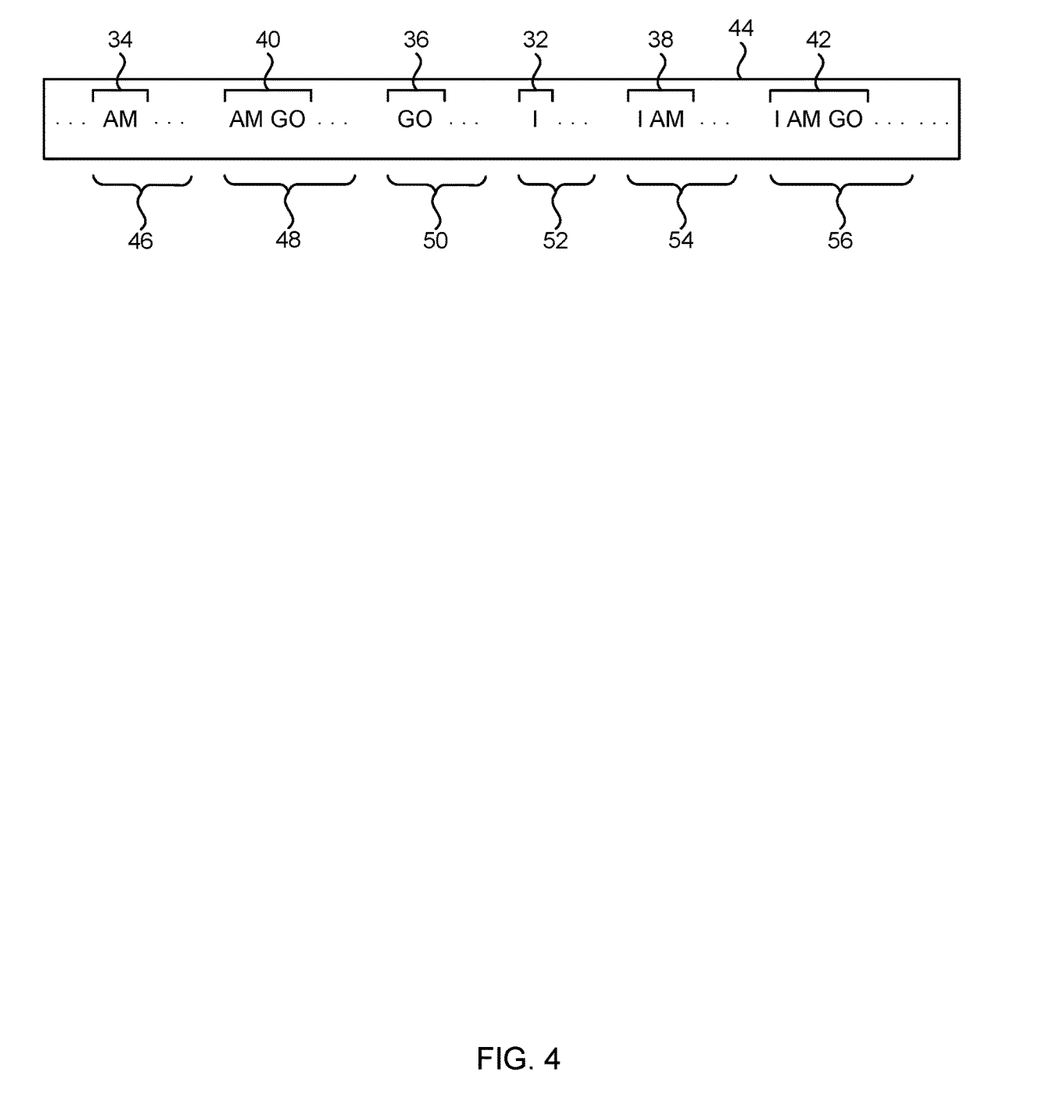
FIG. 4 is a schematic diagram of another instance of the file format of FIG. 2.

The prediction engine is configured to determine candidate emoji predictions for each n-gram. However, as shown in FIG. 4, the n-grams 32, 34, 36, 38, 40 and 42 are at different locations in the model 44. As a result, a search is conducted for the relevant chunk of the model for each of the six n-grams. A chunk is to be understood as a consecutive sequence of bytes within a file, of a predetermined length.

A suitable search is a binary search. For example, taking the example of the n-gram "am" 34, this is located relatively early in the model because it starts with the letter "a" and the n-grams are in alphabetical order in this example. A processor of the computing device performs the binary search by locating an n-gram approximately mid-way along the length of the model. This may be achieved by fixing a constant size for a chunk of memory (say 1 kilobyte) and starting at the middle point of the file, read this much memory into RAM, from the midpoint of the file onwards. The processor then checks if this chunk contains any n-grams, and if not repeatedly reads the next successive 1 kilobyte chunks until we find an n-gram.

The processor determines whether the located n-gram is after the target n-gram in the alphabet, and determines that subsequent n-grams in the list do not include the target n-gram. The same process is applied to the first half of the model. This results in a quarter of the model being identified as including the target n-gram, if the n-gram is in the prediction model at all. This process is repeated until either the target n-gram "am" 34 is located or the search terminates without locating it. The processor then reads successive chunks of memory as necessary until all the emoji and scores for the target n-gram have been extracted. The one or more chunks containing the emoji and scores for the target n-gram are brought into RAM.

This is repeated for the other n-grams and one or more chunks 48, 50, 52, 54, 56 of the model corresponding to each of the respective other n-grams is brought into primary memory. The amount of the flattened model that is loaded into RAM may for example be limited to a maximum of 1 kilobyte using this technique, if the searches are performed sequentially.

The search, which may be a binary search as described above, can be performed on a different thread for each n-gram so that the searches for the different chunks can be run in parallel. This process of using binary searching requires very little RAM (of the order of a few kilobytes) even if the model file size is very large (e.g. 2 gigabytes) because no more than 1 kilobyte of the model is brought into primary memory per thread. For example, if there are 50 operations running in parallel and each operation adds a maximum of 1 kilobyte to the RAM used, this would limit RAM usage to 50 kilobytes. A maximum of 1 kilobyte provides a reasonable trade-off between speed and RAM-usage since, for example, reading two 512 byte chunks from the hard-drive would generally be less efficient than reading a single 1 kilobyte chunk.

Figure 5:
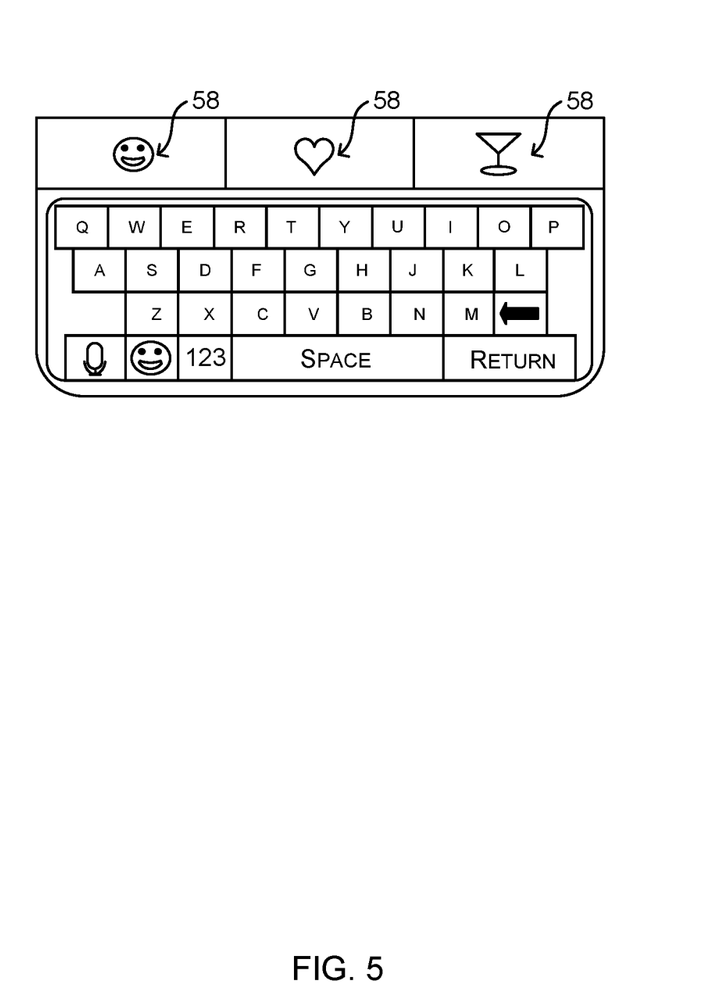
FIG. 5 is a schematic diagram of a display of a computing device presenting predicted emoji to a user.

When the chunks 46, 48, 50, 52, 54, 56 have been brought into primary memory, the processor of the computing device can determine the highest scores in the chunks. The emoji 58 with the top scores can then be presented to the user, for example as shown in FIG. 5. Multiple scores assigned to a single emoji by multiple n-grams can be resolved for example by adding them together or by taking the maximal value.

As can be appreciated, the format of the model may be considered to be an ordered list of n-grams, for example alphabetical order, with scores assigned by each n-gram to each emoji of a set of emoji that the model predicts.

Figure 6:
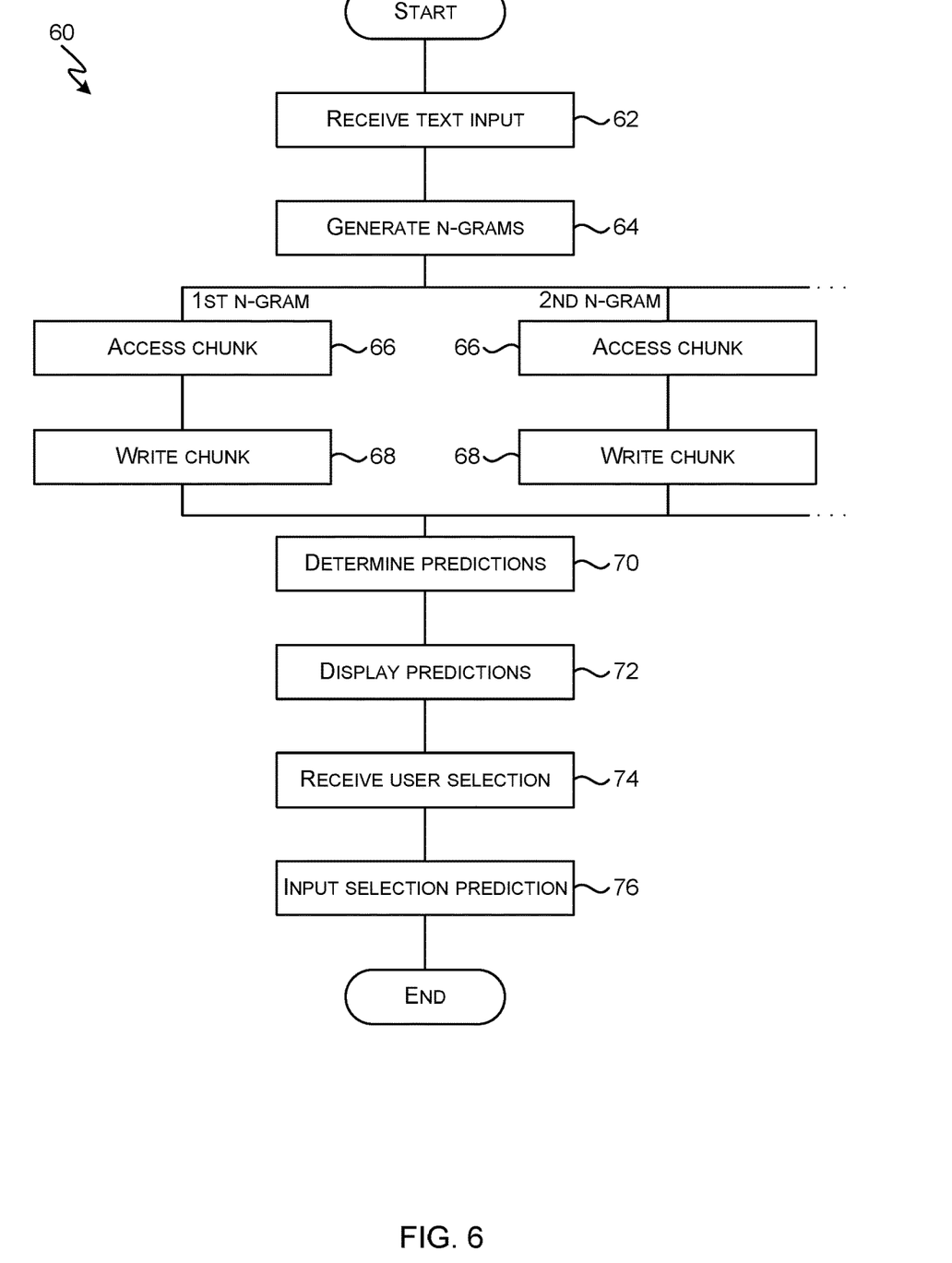
FIG. 6 is a flow chart showing a method of predicting an emoji from text input according to the present disclosure.

With reference to FIG. 6, a method 60 of predicting emoji from text input at a computing device will now be described. The computing device receives 62 text input from the user, for example at an input/output controller of the computing device such as a user interface. A processor of the computing device generates 64 one or more n-grams from the received text input, each of which can be used to form the basis of a search of the model. The processor performs searches in parallel on the model to locate and access 66 chunks of the model that correspond to each of the n-grams. The searches may be binary searches as described above. Once each chunk is located, it is written 68 to primary memory such as RAM.

The processor determines 70 predicted emoji by determining the highest scoring emoji in the chunks stored in primary memory. The computing device displays 72 the predicted emoji to the user, for example on a touch screen of the computing device, with which the user can select the desired emoji from among the predicted emoji that are presented. The computing device receives 74 the user selection and inputs 76 the selected predicted emoji into the text where the user is typing.

Figure 7:
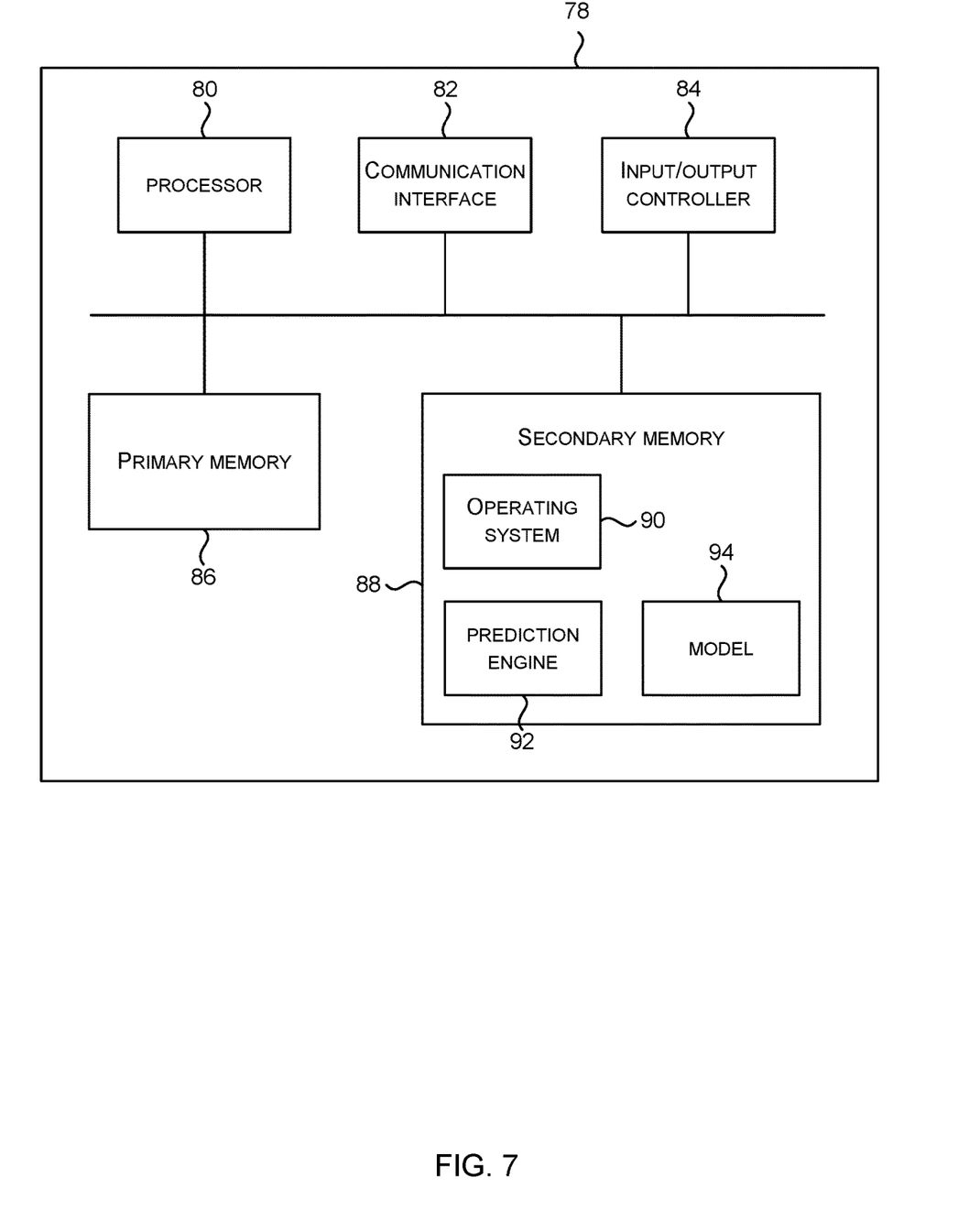
FIG. 7 is a schematic diagram of a computing device suitable for performing the method of FIG. 6.

A computing device 78 suitable for implementing the method 60 is shown in FIG. 7. The computing device 78 comprises a processor 80, a communication interface 82, an input/output controller 84, a primary memory 86 such as RAM, and a secondary memory 88 such as a hard-disk. The secondary memory 88 stores an operating system 90, a prediction engine 92 and a prediction model 94.

The technique disclosed herein could be used for any predictive keyboard, whether for words, emoji or both, or any other kind of data. In the case of predicting words, the format of the model would include delimiters to distinguish between input text and predicted text.

In the above description, the techniques are implemented using instructions provided in the form of stored software. Alternatively, or in addition, the functionality described herein is performed, at least in part, by one or more hardware logic components. For example, and without limitation, illustrative types of hardware logic components that are optionally used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUs).

The term 'computer' or 'computing-based device' is used herein to refer to any device with processing capability such that it executes instructions. Those skilled in the art will realize that such processing capabilities are incorporated into many different devices and therefore the terms 'computer' and 'computing-based device' each include personal computers (PCs), servers, mobile telephones (including smart phones), tablet computers, set-top boxes, media players, games consoles, personal digital assistants, wearable computers, and many other devices.

The methods described herein are performed, in some examples, by software in machine readable form on a tangible storage medium e.g. in the form of a computer program comprising computer program code means adapted to perform all the operations of one or more of the methods described herein when the program is run on a computer and where the computer program may be embodied on a computer readable medium. The software is suitable for execution on a parallel processor or a serial processor such that the method operations may be carried out in any suitable order, or simultaneously.

This acknowledges that software is a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions are optionally distributed across a network. For example, a remote computer is able to store an example of the process described as software. A local or terminal computer is able to access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The operations of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

The term 'subset' is used herein to refer to a proper subset such that a subset of a set does not comprise all the elements of the set (i.e. at least one of the elements of the set is missing from the subset).

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The methods herein, which involve input text from users in their daily lives, may and should be enacted with utmost respect for personal privacy. Accordingly, the methods presented herein are fully compatible with opt-in participation of the persons being observed. In embodiments where personal data is collected on a local system and transmitted to a remote system for processing, that data can be anonymized in a known manner.

The invention claimed is:

1. A computing device comprising a processor and memories comprising a primary memory and a secondary memory, the memories storing thereon computer-readable instructions that, when executed by the processor, configure the computing device to perform operations comprising:
receiving text input;
determining a plurality of n-grams from the text input;
executing a prediction engine, the prediction engine having been trained to predict an emoji based on text data, wherein the secondary memory stores thereon a model usable by the prediction engine to compute the predicted emoji based on the text input;
accessing, by performing a search for the plurality of n-grams on different threads in parallel, one or more chunks of the model from the secondary memory, the one or more chunks selected based on the plurality of n-grams determined from the text input and including one or more corresponding emojis for each n-gram of the plurality of n-grams and one or more corresponding scores based on probabilities of the one or more emojis corresponding to a respective n-gram, wherein each chunk of the one or more chunks includes a corresponding emoji and a corresponding score for a probability of the corresponding emoji applying to an n-gram of a respective chunk;
providing the one or more chunks to the primary memory, the one or more chunks to be accessed from the primary memory during execution of the prediction engine, wherein the one or more chunks are provided to the primary memory in parallel and wherein a maximum data size per thread is allocated for the one or more chunks to limit usage of the primary memory; and outputting, from the prediction engine, the predicted emoji for display based on a respective score of the predicted emoji from the one or more chunks of the model in the primary memory exceeding remaining scores from the one or more corresponding scores.

2. The computing device of claim 1, wherein the model comprises a list of text inputs and, for each of the text inputs, one or more pairs of a term and an associated score, each score corresponding to an association between the term and the text input.

3. The computing device of claim 1, wherein the prediction engine is configured to generate one or more n-grams from the text input, further comprising computer-readable instructions that, when executed by the processor, configure the computing device to perform operations comprising:

accessing a corresponding chunk of the model for each n-gram; and providing each corresponding chunk to the primary memory.

4. The computing device of claim 3, further comprising computer-readable instructions that, when executed by the processor, configure the computing device to perform operations comprising accessing a corresponding chunk of the model for each n-gram by performing a search for the corresponding chunk.

5. The computing device of claim 4, wherein the search is a binary search.

6. The computing device of claim 4, further comprising computer-readable instructions that, when executed by the processor, configure the computing device to perform operations comprising, for each n-gram, performing the search using a different thread.

7. The computing device of claim 1, wherein the prediction engine is configured to determine predictions by selecting terms having highest total scores or highest value scores, the terms corresponding to emojis.

8. The computing device of claim 7, wherein the terms comprise words and the model comprises delimiters.

9. A method performed by a computing device, the method comprising:

receiving, by the computing device, data indicative of text input;

determining a plurality of n-grams from the text input;

executing a prediction engine, the prediction engine having been trained to predict an emoji based on text data, wherein a secondary memory stores thereon a model usable by the prediction engine to compute the predicted emoji based on the text input;

accessing, by performing a search for the plurality of n-grams on different threads in parallel, using a processor of the computing device, one or more chunks of the model from the secondary memory of the computing device, based on the plurality of n-grams determined from the text input and one or more chunks including one or more corresponding emojis for each n-gram of the plurality of n-grams and one or more corresponding scores based on probabilities of the one or more emojis corresponding to a respective n-gram, wherein each chunk of the one or more chunks includes a corresponding emoji and a corresponding score for a probability of the corresponding emoji applying to an n-gram of a respective chunk;

providing, using the processor of the computing device, the one or more chunks of the model to a primary memory of the computing device, the one or more chunks to be accessed from the primary memory during prediction of emojis via the prediction engine, wherein the one or more chunks are provided to the primary memory in parallel and wherein a maximum data size per thread is allocated for the one or more chunks to limit usage of the primary memory;

computing, at the prediction engine using the processor of the computing device, a predicted emoji using the text input by using the one or more chunks stored in the primary memory; and outputting the predicted emoji for display based on a respective score of the predicted emoji from the one or more chunks of the model in the primary memory exceeding remaining scores from the one or more corresponding scores.

10. The method of claim 9, wherein the model comprises a list of text inputs and, for each of the text inputs, one or more pairs of a term and an associated score, each score corresponding to an association between the term and the text input, the term corresponding to a respective emoji.

11. The method of claim 9, further comprising:
generating one or more n-grams from the text input;
accessing a corresponding chunk of the model for each n-gram; and
providing each corresponding chunk to the primary memory.

12. The method of claim 11, further comprising accessing a corresponding chunk of the model for each n-gram by performing a search for the corresponding chunk.

13. The method of claim 12, wherein the search is a binary search.

14. The method of claim 12, further comprising, for each n-gram, performing the search using a different thread.

15. The method of claim 9, further comprising determining the predictions by selecting terms having highest scores, the terms corresponding to emojis.

16. The method of claim 15, wherein the terms comprise words and the model comprises delimiters.

17. A non-transitory machine readable medium including instructions to, when executed by a processor, cause the processor to perform operations comprising:

receiving text input;

determining a plurality of n-grams from the text input;

executing a prediction engine, the prediction engine having been trained to predict an emoji based on text data, wherein a secondary memory stores thereon a model usable by the prediction engine to compute the predicted emoji based on the text input;

accessing, by performing a search for the plurality of n-grams on different threads in parallel, one or more chunks of the model from the secondary memory, the one or more chunks selected based on the plurality of n-grams determined from the text input and the one or more chunks including one or more corresponding emojis for each n-gram of the plurality of n-grams and one or more corresponding scores based on probabilities of the one or more emojis corresponding to a respective n-gram, wherein each chunk of the one or more chunks includes a corresponding emoji and a corresponding score for a probability of the corresponding emoji applying to an n-gram of a respective chunk;

providing the one or more chunks of the model to a primary memory, the one or more chunks to be accessed from the primary memory during prediction of emojis via the prediction engine, wherein the one or more chunks are provided to the primary memory in parallel and wherein a maximum data size per thread is allocated for the one or more chunks to limit usage of the primary memory;

computing, using the prediction engine, a predicted emoji using the text input and the one or more chunks stored in the primary memory; and outputting the predicted emoji for display based on a respective score of the predicted emoji from the one or more chunks of the model in the primary memory exceeding remaining scores from the one or more corresponding scores.

\* \* \* \* \*